United States Patent Office 3,845,135
Patented Oct. 29, 1974

3,845,135
MANUFACTURE OF β-IONONES
Werner Hoffmann and Roman Rischer, Ludwigshafen,
Germany, assignors to Badische Anilin- & Soda-Fabrik
Aktiengesellschaft, Ludwigshafen (Rhine), Germany
No Drawing. Filed May 7, 1971, Ser. No. 141,348
Int. Cl. C07c 49/48
U.S. Cl. 260—586 C        4 Claims

ABSTRACT OF THE DISCLOSURE

The invention relates to a process for the manufacture of β-ionones by cyclization of pseudo-ionones with sulfuric acid, the essential feature being the use of mixtures of unsubstituted or substituted hydrocarbons and aliphatic alcohols as the reaction medium, which mixtures permit highly economical and, if desired, continuous operation.

---

This invention relates to a process for the manufacture of β-ionones.

German Patent 1,000,374 reveals the β-ionones may be produced from 6,10 - dimethyl-undeca-3,5,10-trien-2-one using acid agents and solvents or diluents. According to the teaching of this citation cyclization is carried out using a mixture of sulfuric acid and glacial acetic acid to produce a mixture of α- and β-ionones.

German Patent 1,080,105 reveals a method of cyclizing pseudo-ionones with sulfuric acid in the presence of hydrocarbons to form β-ionone or derivatives thereof. In this process, however, relatively long periods are required in order to cause reaction, and also no stable emulsions are obtained. The ionone/sulfuric acid phase tends to settle in the reaction vessel and thus interferes with heat removal, which in turn leads to resinification of the product with consequent reduction of yield.

According to German Patent 1,137,008, β-ionone may be obtained from appropriate starting materials, for example by cyclizing 2-methoxy-2,6-dimethyl-undeca-6,8-dien-10-one with sulfuric acid in the presence or absence of diluents. In this case also, phase separation occurs with consequent resinification.

Finally, German Published Application DAS 1,292,333 discloses that pseudo-ionone may be cyclized to ionone with sulfuric acid in the presence of lower alcohols. However, cyclization of the pseudo-ionone isomer 6-10-dimethyl-undeca-3,5,10-trien-2-one repeating Example 1 of the last-named citation produced a β-ionone which contained 11% of α-ionone as impurity. Thus this process is not generally applicable to all pseudo-ionone compounds. Here again, the time required for combiation of the sulfuric acid and the pseudo-ionone compound is relatively long, being about 1 hour for laboratory mixtures containing about 100 g. of starting compound.

β-Ionone is an important intermediate in the synthesis of vitamin A. Any content of α-ionone means a loss of yield. Moreover, the previously described cyclizations produce highly viscous solutions which are difficult to stir and thus complicate working to a high degree, particularly in continuous operations.

We have now found that β-ionones of the formula I:

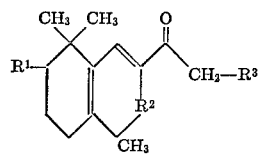

in which $R^1$, $R^2$ and $R^3$ denote hydrogen or methyl, may be obtained by cyclization of pseudo-ionones with sulfuric acid, when pseudo-ionones of the formula II:

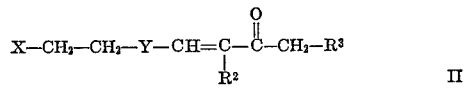

in which X denotes radicals of the formulae:

$R^1$—CH—C(CH$_3$)=CH$_2$,
$R^1$—C=C(CH$_3$)$_2$ or
$R^1$—CH—C(CH$_3$)$_2$—OCH$_3$ and Y denotes the radical of the formula:

—C(CH$_3$)=CH— and $R^1$, $R^2$ and $R^3$ have the meanings stated above, are used and cyclization is carried out in the temperature range —30° to +20° C. and in the presence of mixtures of optionally chlorinated hydrocarbons which are liquids under the conditions of the reaction and which boil at temperatures below 200° C. at atmsopheric pressure and lower aliphatic alcohols, the molar ratio of pseudo-ionone to alcohol being 1:0.05–5 and that of pseudo-ionone to sulfuric acid being 1:5–15, the sulfuric acid used having a strength of from about 90 to 98%.

Suitable starting materials for the process of the invention are compounds of formula II, in which $R^1$, $R^2$ and $R^3$ have the meanings stated for formula I, specific examples being 6,10-dimethyl-undeca-3,5,10-trien-2-one, 6,9,10-trimethyl-undeca-3,5,10-trien-2-one, 3,6,10-trimethyl-undeca-3,5,10-trien-2-one, 7 - 11-dimethyl-dodeca-4,6,11-trien-3-one, 6,10-dimethyl-undeca-3,5,9-trien-2-one ($R^1$, $R^2$, $R^3$=H), and 10-methoxy-6,10-dimethyl-undeca-3,5-dien-2-one ($R^1$, $R^2$, $R^3$=H).

Suitable hydrocarbons are all aliphatic and aromatic hydrocarbons which are not adversely influenced by the sulfuric acid under the conditions of the reaction, are liquids under the conditions of the reaction, are liquids under the conditions of the reaction and boil at temperatures below 200° C. at atmospheric pressure. Specific examples are saturated aliphatic hydrocarbons such as methane, ethane, propane, butane, pentane, hexane, cyclohexane and aromatic hydrocarbons such as benzene and xylene. Aliphatic hydrocarbons are preferred. Examples of chlorinated hydrocarbons are methyl chloride, methylene chloride, chloroform, carbon tetrachloride, 1,2-dichloroethane, trichloroethane, chlorocyclohexane and chlorobenzene. Mixtures of two or more hydrocarbons, optionally chlorinated, may also be used. Hydrocarbons which are gaseous at the temperature of the reaction may be kept in the liquid state by employing superatmospheric pressure during the reaction.

By lower alcohols we mean those having one or more hydroxyl groups in the molecule and containing from 1 to 6 and preferably from 1 to 4 carbon atoms in the molecule. Preferred representatives of this group are methanol, ethanol, propanol, iso-propanol, butanol, iso-butanol, ethylene glycol and propylene glycol. Mixtures of alcohols of the above definition may also be used. Within the molar ratio limits stated above, we prefer to use, per mole of pseudo-ionone, from 0.5 to 2 moles and in particular approximately 1 mole of alcohol and from 7 to 12 moles of sulfuric acid. It is particularly advantageous to use sulfuric acid of a concentration of from 96 to 98%. It is convenient to use from approximately 1 to 15 and preferably from 2 to 14 parts by volume of the said hydrocarbon per part by volume of pseudo-ionone. Larger amounts, for example 17 parts by volume, may also be used however.

The process of the invention has the advantage that it provides stable emulsions which are easy to stir and permit easy removal of heat. Thus the formation of resins, which is caused by local overheating, is substantially avoided, and there is no reduction in yield. Another advantage of our novel process is that it may be carried out continuously on an industrial scale. Yet another advantage is the fact that it enables β-ionones to be produced which are free from α-isomers and are thus directly available for the synthesis of vitamin A.

One method of carrying out the process, for example, is to bring together the pseudo-ionone, the alcohol and a mixture of sulfuric acid and hydrocarbon at a temperature of from −30° to +20° C. and preferably from −20° to 0° C. within approximately 5 minutes, the heat of reaction being removed by a cooling bath, conveniently a bath comprising a mixture of Dry Ice and methanol or acetone. Following a holding period of from 5 to 120, preferably from 5 to 60 and more preferably of about 15 minutes, the mixture is worked up by usual methods. In continuous operation, the residence times are achieved by using apparatus of appropriate sizes. In particular, when chlorinated hydrocarbons are used, it may be advantageous to use glass-lined apparatus made entirely of glass.

In the following Examples the parts are by weight unless otherwise stated. The parts by weight bear the same relationship to parts by volume as do grams to milliliters.

Example 1

220 parts by volume (equivalent to 401 parts by weight) of concentrated sulfuric acid and 120 parts by volume of n-hexane are vigorously stirred at from −15° to −10° C. while a solution of 80 parts by volume (equivalent to 72.1 parts by weight, i.e. 0.376 molar equivalents) of 6,10-dimethyl-undeca-3,5,10-trien-2-one ($E_{1cm}^{1\%}$ 1185 at 293 m$\mu$; 95% pure), in 100 parts by volume of n-hexane and 15.25 parts by volume (equivalent to 12 parts by weight, i.e. 0.376 molar equivalent) of methanol is added over 5 minutes. The heat of reaction is removed through a bath consisting of a mixture of methanol and carbon dioxide. On completion of the addition, the mixture is stirred for a further 15 minutes at the temperature stated. A completely emulsified reaction mixture is obtained, which shows no phase separation for at least 3 minutes after the stirrer has been stopped. The mixture is hydrolyzed with 1,000 parts of ice, and the organic portions are extracted by repeated shaking with n-hexane or ether. The combined organic extracts are then washed with sodium carbonate solution until neutral. The solvent is removed by evaporation and the residue is distilled. There are thus obtained 64 parts of β-ionone ($E_{1cm}^{1\%}$ 532 at 293 m$\mu$; yield 88%).

Analysis by gas chromatography shows that the product contains 95.5% of β-ionone, no α-ionone and 4.5% of low-boiling products formed by the cyclization of β-ionone. The boiling point is 76–81° C./0.02 mm.

The product may be used without further purification for conversion to, say, vinyl ionol.

Example 2

Example 1 is repeated as regards proportions, reaction conditions and working-up procedure, but the methanol used in Example is replaced by 42 parts by volume (equivalent to 33.6 parts by weight, i.e. 0.45 molar equivalent) of isobutanol. Distillation produces 61 parts of β-ionone ($E_{1cm}^{1\%}$ 518 at 293 m$\mu$; yield 84%).

Analysis by gas chromatography shows that the product contains 95% of β-ionone and no α-ionone.

Example 3

To a vigorously stirred mixture of 220 parts by volume of concentrated sulfuric acid and 120 parts by volume of ligroin there are added, at from −15° to −10° C. over 5 minutes, 96 parts by volume (equivalent to 88.3 parts by weight, i.e. 0.394 molar equivalent) of 10-methoxy-6,10-dimethyl-undeca-3,5-dien-2-one, 200 parts by volume of ligroin and 15.25 parts by volume (equivalent to 12 parts by weight, i.e. 0.376 molar equivalent) of methanol. After a holding time of 15 minutes, the reaction is worked up in the manner described in Example 1. The distillation produces 65 parts of β-ionone ($E_{1cm}^{1\%}$ 522 at 293 m$\mu$; yield 85%).

Analysis by gas chromatography and nuclear resonance spectra show that the product contains no α-ionone.

During reaction the mixture is completely emulsified. The emulsion remains stable for at least 3 minutes after completion of the reaction.

Example 4

A mixture of 216 parts of concentrated sulfuric acid and 120 parts of ligroin is stirred vigorously at −10° C. while a solution of 41 parts (0.2 molar equivalent) of 6,9,10-trimethyl-undeca-3,5,10-trien-2-one and 9.2 parts (0.2 molar equivalent) of ethanol is added over 5 minutes. After a holding time of 15 minutes, the homogeneous reaction mixture is worked up in the manner described in Example 1. Distillation produces 35 parts of β-irone (85% yield), b.p. 77–81° C./0.1 mm.; $n_D^{20}$ 1.5203.

Example 5

209 parts of concentrated sulfuric acid and 41 parts of n-hexane are vigorously stirred at from −15° to −10° C. while a solution of 37.5 parts of 6,10-dimethyl-undeca-3,5,9-trien-2-one ($E_{1cm}^{1\%}$ 1062 at 293 m$\mu$; approx. 85% pure)

in 35 parts of n-hexane and 6.25 parts of methanol is added over 5 minutes. The resulting heat of reaction is removed through a bath consisting of a mixture of methanol and Dry Ice. On completion of the addition, the mixture is stirred at the temperature stated for a further 15 minutes. The reaction mixture is completely emulsified and shows no phase separation for at least 3 minutes after the stirrer has been stopped. Working-up is continued in the manner described in Example 1, and the residue remaining after the solvent has been evaporated off is distilled. There are obtained 28 parts of β-ionone ($E_{1cm}^{1\%}$ 529 at 293 m$\mu$; yield 85%).

Analysis by gas chromatography shows that the product contains 97% of β-ionone and no α-ionone.

Example 6

220 parts by volume of concentrated sulfuric acid and 100 parts by volume of methylene chloride are vigorously stirred at from −10° to −15° C. while a solution of 80 parts by volume of 6,10-dimethyl-undeca-3,5,10-trien-2-one in 100 parts by volume of methylene chloride and 15.25 parts by volume of methanol is added over 5 minutes. The heat of reaction is removed through a bath of methanol and Dry Ice. On completion of the addition, the mixture is stirred for a further 15 minutes at −10° C. The reaction mixture is completely emulsified and shows no phase separation for at least three minutes after the stirrer has been stopped.

The reaction mixture is hydrolyzed with 1,000 parts of ice and the organic portions are extracted by shaking with methylene chloride a number of times. The combined organic extracts are washed with sodium carbonate solution until neutral. The methylene chloride is removed by evaporation and the residue is distilled. There are obtained 61 parts of β-ionone ($E_{1cm}^{1\%}$ 526 at 293 m$\mu$; yield 83%).

Analysis by gas chromatography shows that the product contains no α-ionone. The boiling point is 73–78° C./0.03 mm.

Using 1,2-dichloroethane, t-butyl chloride or chlorobenzene in place of the methylene chloride, the same results are obtained.

We claim:

1. A continuous process for the manufacture of β-ionone of formula I

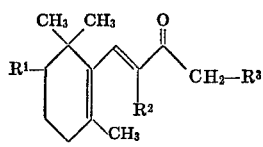

in which $R^1$, $R^2$ and $R^3$ denote hydrogen or methyl, by cyclization of pseudo-ionones with sulfuric acid, wherein pseudo-ionones of formula II

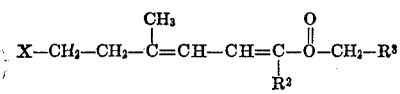

in which X denotes radicals of the formulae:

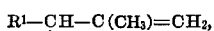

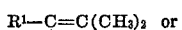

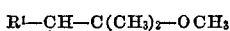

and $R^1$, and $R^2$ and $R^3$ have the meanings stated above, are cyclized and cyclization is carried out in the temperature range −30° to +20° C. and in the presence of mixtures of hydrocarbons which are liquids under the conditions of the reaction and which boil at temperatures below 200° C. at atmospheric pressure selected from the group consisting of methane, ethane, propane, butane, pentane, hexane, cyclohexane, benzene and xylene and lower aliphatic alcohols selected from the group consisting of alkanols of 1 to 6 carbon atoms, ethylene glycol and propylene glycol, the molar ratio of pseudo-ionone to hydrocarbon being about 1:1–17, that of pseudo-ionone to alcohol being 1:0.5–2 and that of pseudo-ionone to sulfuric acid being 1:7–12, the sulfuric acid used having a strength of from 90 to 98%.

2. A process as claimed in claim 1, wherein the starting compound is 6,10-dimethyl-undeca-3,5,10-trien-2-one.

3. A process as claimed in claim 1 wherein the ratio by volume of pseudo-ionone to hydrocarbon is 1:2–14 and 96–98% sulfuric acid is used.

4. A process as claimed in claim 3 wherein said pseudo-ionone, alcohol and mixture of sulfuric acid and hydrocarbon are brought together within about five minutes and wherein the reaction mixture is held at said temperature for another 15 to 120 minutes.

References Cited

UNITED STATES PATENTS

| | | | |
|---|---|---|---|
| 2,877,271 | 3/1959 | Kaiser et al. | 260—587 |
| 3,475,764 | 10/1969 | Pot et al. | 260—587 |
| 3,344,192 | 9/1967 | Kes et al. | 260—587 |

FOREIGN PATENTS

| | | | |
|---|---|---|---|
| 77,225 | 7/1963 | India | 260—587 |

HOWARD T. MARS, Primary Examiner

N. MORGENSTERN, Assistant Examiner

UNITED STATES PATENT AND TRADEMARK OFFICE
CERTIFICATE OF CORRECTION

PATENT NO. : 3,845,135
DATED : Oct. 29, 1974
INVENTOR(S) : Werner Hoffmann and Roman Rischer It is certified that error appears in the above-identified patent and that said Letters Patent are hereby corrected as shown below:

Column 1, in the heading, insert --Claims priority, Application Germany, May 13, 1970, P 20 23 294.4 and April 10, 1971, P 21 17 680.7--;

Column 5, line 15, delete "X-CH$_2$-CH$_2$-$\overset{CH_3}{C}$=CH-CH=$\overset{}{\underset{R_2}{C}}$-$\overset{O}{\underset{}{C}}$-O-CH$_2$-R$^3$" and substitute --X-CH$_2$-CH$_2$-$\overset{CH_3}{C}$=CH-CH=$\overset{}{\underset{R_2}{C}}$-$\overset{O}{\underset{}{C}}$-CH$_2$-R$^3$--;

Column 2, lines 9-11, delete

"R$^1$-CH-C(CH$_3$)=CH$_2$,
R$^1$-C=C(CH$_3$)$_2$ or
R$^1$-CH-C(CH$_3$)$_2$-OCH$_3$"    and substitute --R$^1$-CH-C(CH$_3$)=CH$_2$,
R$^1$-C=C(CH$_3$)$_2$ or
R$^1$-CH-C(CH$_3$)$_2$-OCH$_3$--.

Signed and Sealed this thirtieth Day of March 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,845,135
DATED : October 29, 1974
INVENTOR(S) : Werner Hoffmann and Roman Fischer It is certified that error appears in the above-identified patent and that said Letters Patent are hereby corrected as shown below:

In the heading, first line after the title, delete "Roman Rischer" and substitute --Roman Fischer--;

Column 2, lines 38 and 39, delete "are liquids under the conditions of the reaction, are liquids under the conditions of the reaction and boil at temperatures" and substitute --are liquids under the conditions of the reaction and boil at temperatures--.

Signed and Sealed this twenty-seventh Day of April 1976

[SEAL]

Attest:

RUTH C. MASON
Attesting Officer

C. MARSHALL DANN
Commissioner of Patents and Trademarks